United States Patent
Saarinen et al.

(10) Patent No.: US 10,108,701 B2
(45) Date of Patent: Oct. 23, 2018

(54) SYSTEM AND METHOD FOR DETERMINING CONTEXT

(75) Inventors: Jukka Saarinen, Nokia (FI); Leo Karkkainen, Helsinki (FI); Mikko Terho, Tampere (FI); Ilenia Fronza, Pergine (IT); Andrea Janes, Lana (IT); Alberto Sillitti, Bolzano (IT); Giancarlo Succi, Bolzano (IT)

(73) Assignee: NOKIA TECHNOLOGIES OY, Espoo (FI)

( * ) Notice: Subject to any disclaimer, the term of this patent is extended or adjusted under 35 U.S.C. 154(b) by 604 days.

(21) Appl. No.: 14/378,015

(22) PCT Filed: Feb. 22, 2012

(86) PCT No.: PCT/FI2012/050180
§ 371 (c)(1),
(2), (4) Date: Feb. 3, 2015

(87) PCT Pub. No.: WO2013/124521
PCT Pub. Date: Aug. 29, 2013

(65) Prior Publication Data
US 2015/0154285 A1 Jun. 4, 2015

(51) Int. Cl.
*G06F 7/00* (2006.01)
*G06F 17/30* (2006.01)
(Continued)

(52) U.S. Cl.
CPC ......... *G06F 17/30675* (2013.01); *G06K 9/72* (2013.01); *G06N 99/005* (2013.01); *H04M 1/72569* (2013.01); *G06K 2209/01* (2013.01)

(58) Field of Classification Search
None
See application file for complete search history.

(56) References Cited

U.S. PATENT DOCUMENTS 6,912,386 B1 6/2005 Himberg et al.
8,516,205 B2 8/2013 Karkkainen et al.
(Continued)

FOREIGN PATENT DOCUMENTS

CN 1611082 A 4/2005
CN 101088272 A 12/2007
(Continued)

OTHER PUBLICATIONS

Raga et al., "Combining Random Indexing and Instance-Based Learning to Analyze Sentential Units of Text", Proceedings of the Philippine Computing Science Congress, 2010, 7 Pages.
(Continued)

*Primary Examiner* — Tuan A Pham
(74) *Attorney, Agent, or Firm* — Alston & Bird LLP

(57) ABSTRACT

The invention relates to determining a context of a system so that the system can be controlled or the context information be used in the system. The context of a system is described with tags or words that characterize e.g. the state of the system, the surroundings of the system and the state of the user. These tags are determined at multiple time instances. The tags are collected over a first time span and a second time span, and the two (or more) sets of tags are used to determine the context of the system. If the determination using the two sets gives a different result, that is, there is a large distance between the two derived contexts, it is determined that a change in context has occurred. Detecting the change in context can be used to control the system, e.g. by changing the applications presented to the user on the user interface, or by changing the state and/or priority of applications.

16 Claims, 6 Drawing Sheets

(51) Int. Cl.
H04M 1/725 (2006.01)
G06K 9/72 (2006.01)
G06N 99/00 (2010.01)

(56) References Cited

U.S. PATENT DOCUMENTS

| | | | |
|---|---|---|---|
| 2005/0143971 A1 | 6/2005 | Berstein et al. | |
| 2006/0143298 A1 | 6/2006 | Anttila et al. | |
| 2007/0197195 A1 | 8/2007 | Sugiyama et al. | |
| 2007/0239813 A1* | 10/2007 | Pinder | G01S 19/48 708/270 |
| 2010/0005087 A1* | 1/2010 | Basco | G06F 17/30864 707/E17.017 |
| 2010/0229082 A1 | 9/2010 | Karmarkar et al. | |
| 2011/0044447 A1* | 2/2011 | Morris | G06T 11/206 379/265.03 |
| 2012/0209847 A1* | 8/2012 | Rangan | G06F 17/3069 707/737 |
| 2012/0290434 A1* | 11/2012 | Moritz | G06Q 30/0261 705/26.7 |
| 2013/0297547 A1* | 11/2013 | Ding | G06N 5/02 706/46 |
| 2014/0207457 A1* | 7/2014 | Biatov | G10L 15/063 704/243 |

FOREIGN PATENT DOCUMENTS

| | | |
|---|---|---|
| JP | 2001-324335 A | 11/2001 |
| JP | 2006-302194 A | 11/2006 |
| JP | 2010-067175 A | 3/2010 |
| JP | 2011-227758 A | 11/2011 |
| WO | 2006/075512 A1 | 7/2006 |
| WO | 2011107751 A1 | 9/2011 |
| WO | 2012/000186 A1 | 1/2012 |
| WO | 2012123621 A1 | 9/2012 |

OTHER PUBLICATIONS

Landauer et al., "A Solution to Plato's Problem: The Latent Semantic Analysis Theory of Acquisition, Induction, and Representation of Knowledge", Psychological Review, vol. 104, No. 2, 1997, pp. 211-240.
"Schutze et al., "Automatic Word Sense Discrimination", Journal Computational Linguistics, vol. 24, No. 1, Mar. 1998, pp. 97-123."
Bingham et al., "Random Projection in Dimensionality Reduction: Applications to Image and Text Data", Proceedings of the seventh ACM SIGKDD international conference on Knowledge discovery and data mining, 2001, pp. 245-250.
Caid et al., "Learned Vector-Space Models for Document Retrieval", Information Processing and Management: an International Journal—Special issue: the second text retrieval conference (TREC-2), vol. 31, No. 3, May-Jun. 1995, pp. 1-13.
Vries et al., "Random Indexing K-tree", Proceedings of the Fourteenth Australasian Document Computing Symposium, Dec. 4, 2009, 8 pages.
Deerwester et al., "Indexing by Latent Semantic Analysis", Journal of the American Society for Information Science, vol. 41, No. 6, Sep. 1990, pp. 391-407.
Dumais, "LSI meets TREC: A Status Report", In proceedings of the First Text Retrieval Conference, 1993, 12 pages.
Dumais et al., "Automatic Cross-Language Retrieval Using Latent Semantic Indexing", In Spring Symposium Series: Cross Language Text and Speech Retrieval, Mar. 24-26, 1997, pp. 15-21.
Gallant, "A Practical Approach for Representing Context and for Performing Word Sense Disambiguation Using Neural Networks", IJCNN-91—Seattle International Joint Conference on Neural Computation, vol. 2, Jul. 8-14, 1991, 7 pages.
Gorman et al., "Random Indexing using Statistical Weight Functions", Proceedings of the Conference on Empirical Methods in Natural Language Processing, Jul. 2006, pp. 457-464.

Jiang et al., "Approximate Dimension Equalization in Vector-Based Information Retrieval", Proceedings of the Seventeenth International Conference on Machine Learning, 2000, 7 pages.
Karlgren et al., "From Words to Understanding", Foundations of Real-World Intelligence, 2001, pp. 294-311.
Kanerva et al., "Random Indexing of Text Samples for Latent Semantic Analysis", In Proceedings of the 22nd Annual Conference of the Cognitive Science Society, 2000, 1 pages.
Kanerva et al., "Computing With Large Random Patterns", Foundations of real-world intelligence, 2001, pp. 251-316.
Kaski, "Dimensionality Reduction by Random Mapping: Fast Similarity Computation for Clustering", Proceedings of the International Joint Conference on World Congress on Computational Intelligence, 1998, vol. 1, May 4-8, 1998, 6 Pages.
Landauer et al., "A Solution to Plato's Problem: The Latent Semantic Analysis Theory of Acquisition, Induction and Representation of Knowledge", Psychological Review, vol. 104, No. 2, pp. 211-240, Apr. 1997.
Levy et al., "Explorations in the derivation of word co-occurrence statistics", South Pacific Journal of Psychology, vol. 10, 1998, pp. 1-14.
Lowe, "What is the Dimensionality of Human Semantic Space", In Proceedings of the 6-th Neural Computation and Psychology Workshop, 2000, 9 pages.
Lund et al., "Semantic and Associative Priming in High-Dimensional Semantic Space", In Proceedings of the 17th Annual Conference of the Cognitive Science Society, 1995, pp. 660-665.
Lund et al., "Producing High-Dimensional Semantic Spaces From Lexical Co-Occurrence", Behavior Research Methods, Instruments, and Computers, vol. 28, No. 2, Jun. 1996, pp. 203-208.
McDonald et al., "Modelling Functional Priming and the Associative Boost", Proceedings of the 20th Annual Meeting of the Cognitive Science Society, 1998, 6 pages.
Musto et al., "Enhanced Vector Space Models for Content-Based Recommender Systems", Proceedings of the fourth ACM conference on Recommender systems, Sep. 26-30, 2010, pp. 361-364.
Sahlgren et al., "Using Bag-of-Concepts to Improve the Performance of Support Vector Machines in Text Categorization", Proceedings of the 20th international conference on Computational Linguistics, 2004, 7 pages.
Sahlgren, "The Word-Space Model: Using Distributional Analysis to Represent Syntagmatic and Paradigmatic Relations Between Words in High-Dimensional Vector Spaces", Thesis, 2006, 156 pages.
Schutze et al., "Information Retrieval Based on Word Senses", Proceedings of the 4th Annual Symposium on Document Analysis and Information Retrieval, 1995, 13 pages.
Rapp, "Word Sense Discovery Based on Sense Descriptor Dissimilarity", In Proceedings of the Ninth Machine Translation Summit, 2003, 8 pages.
Schutze et al., "Dimensions of meaning", In Proceedings of the conference on Supercomputing, 1992, pp. 787-796.
Schutze et al., "Automatic Word Sense Discrimination", Computational Linguistics, vol. 24, No. 1, Mar. 1998, pp. 97-123.
Schutze et al., "Word Space", In Proceeding Advances in Neural Information Processing Systems, 1993, 8 pages.
Turney et al., "Mining the Web for Synonyms: PMI-IR Versus LSA on TOEFL", Lecture Notes in Computer Science, vol. 2167, Aug. 30, 2001, pp. 1-12.
Vasuki et al., "Reflective random indexing for semi-automatic indexing of the biomedical literature", Journal of Biomedical Informatics, vol. 43, No. 5, Oct. 2010, pp. 694-700.
Wan et al., "A Random Indexing Approach for Web User Clustering and Web Prefetching", Proceedings of the 15th international conference on New Frontiers in Applied Data Mining, 2011, pp. 40-52.
Wolfe et al., "Learning From Text: Matching Readers and Texts by Latent Semantic Analysis", Discourse Processes, vol. 25, No. 2 & 3, Mar. 1998, pp. 309-336.
Coman et al., "A Case-Study on Using an Automated In-Process Software Engineering Measurement and Analysis system in an Industrial Environment", 31st International Conference on Software Engineering, May 16-24, 2009, pp. 89-99.

(56) References Cited

OTHER PUBLICATIONS

Sillitti et al., "Collecting, Integrating and Analyzing Software Metrics and Personal Software Process Data", 29th Euromicro Conference, Sep. 1-6, 2003, pp. 336-342.
Lee et al., "An Adaptive User Interface Based on Spatiotemporal Structure Learning", IEEE Communications Magazine, vol. 49, No. 6, Jun. 2011, pp. 118-124.
Office action received for corresponding Japanese Patent Application No. 2014-558171, dated Oct. 2, 2015, 4 pages of office action and 5 pages of office action translation available.
Office action received for corresponding Chinese Patent Application No. 2012800723917, dated Jun. 2, 2016, 16 pages of office action and 5 pages of office action translation available.
International Search Report and Written Opinion received for corresponding Patent Cooperation Treaty Application No. PCT/FI2012/050180, dated Jan. 22, 2013, 16 pages.
Berchtold, Processing Sensor Data with the Common Sense Toolkit (CSTK), Lancaster Ubiquitous Computing Group, Mar. 4, 2005, 35 pages.
Chatterjee et al., "Discovering Word Senses From Text Using Random Indexing", Proceedings of the 9th international conference on Computational linguistics and intelligent text processing, 2008, pp. 299-310.
Cohen et al., "Reflective Random Indexing and Indirect Inference: A Scalable Method for Discovery of Implicit Connections", Journal of Biomedical Informatics, vol. 43, No. 2, Apr. 2010, pp. 240-256.
Extended European Search Report received for corresponding European Patent Application No. 12869067.4, dated Feb. 2, 2016, 7 pages.
Krause et al., "Context-Aware Mobile Computing: Learning Context-Dependent Personal Preferences from a Wearable Sensor Array", IEEE Transactions on Mobile Computing, vol. 5, No. 2, Feb. 2006, pp. 113-127.
Office Action received for corresponding Chinese Patent Application No. 2012800723917, dated Jun. 29, 2017, with English language summary, 6 pages.
Schutze et al., "A Cooccurrence-Based Thesaurus and Two Applications to Information Retrieval", Information Processing & Management: an international journal, vol. 33, No. 3, May 1997, pp. 266-274.
Office action received for corresponding Chinese Patent Application No. 201280072391.7, dated Jan. 6, 2017, 9 pages of office action and 5 pages of office action translation available.
Burgess, C. et al., *Modelling Parsing Constraints With High-Dimensional Context Space*, Language and Cognitive Processes, 12 (2/3) (1997), 177-210.
Deerwester et al., *Improving Information Retrieval With Latent Semantic Indexing*, In Proceedings of the 51$^{st}$ Annual Meeting of the American Society for Information Science (1988), 36-40.
Gallant, S., *Context Vector Representations for Document Retrieval*, In Proceeding of the Natural Language Text Retrieval Workshop (1991), 8 pages.
Rehder et al. *Using Latent Semantic Analysis to Assess Knowledge: Some Technical Considerations*, Discourse Processes, vol. 25, Issue 2-3 Quantitative Approaches to Semantic Knowledge Representations (1998) 337-354.
Zipf, G. K., *Human Behavior and the Principle of Least Effort*, Addison-Wesley (1949) 573 pages.
Office Action for European Application No. 12 869 067.4 dated Jun. 27, 2018, 5 pages.

* cited by examiner

SYSTEM AND METHOD FOR DETERMINING CONTEXT

RELATED APPLICATION

This application was originally filed as Patent Cooperation Treaty Application No. PCT/FI2012/050180 filed Feb. 22, 2012.

BACKGROUND

Current electronic user devices like smart phones and computers carry a plurality of functionalities, for example various programs for different needs and different modules for positioning, communication and entertainment. The variety of tasks that can be performed with these devices is large, and the individual tasks may be complex in nature. For example, a lot of the work carried out in today's world is done with the help of computers. Likewise, electronic devices have become part of everyday life in free time, as well.

The user of a modern electronic device like a computer or a smart phone may be overwhelmed by the variety of functions provided by the system. For this purpose, the devices may provide ways of customizing the looks and the arrangement of functions in the device so that the functions of the device that the user needs are easily reachable. However, the state of the system as well as the situation where it is used may have an effect on the preference and needs of the user.

There is, therefore, a need for solutions for determining the situation and/or the state of a user system.

SUMMARY

Now there has been invented an improved method and technical equipment implementing the method, by which the above problems are alleviated. Various aspects of the invention include a method, an apparatus, a server, a client, a data structure and a computer readable medium comprising a computer program stored therein, which are characterized by what is stated in the independent claims. Various embodiments of the invention are disclosed in the dependent claims.

The invention relates to determining a context of a system so that the system can be controlled or the context information be used in the system. The context of a system is described with tags or words that characterize e.g. the state of the system, the surroundings of the system and the state of the user. These tags are determined at multiple time instances. The tags are collected over a first time span and a second time span, and the two (or more) sets of tags are used to determine the context of the system. If the determination using the two sets gives a different result, that is, there is a large distance between the two derived contexts, it is determined that a change in context has occurred. Detecting the change in context can be used to control the system, e.g. by changing the applications presented to the user on the user interface, or by changing the state and/or priority of applications.

According to a first aspect there is provided a method, comprising forming a first set of context tags and a second set of context tags, said first set and said second set corresponding to a context of a system, wherein said first set and said second set correspond to a different time span of said context of said system, deriving first derived context data from said first set and second derived context data from said second set, and determining a difference between said first derived context data and said second derived context data, determining that a change of context has occurred based on said difference, and controlling said system in response to said determined change of context.

According to an embodiment, said first set comprises at least one context tag corresponding to an earlier time instance compared to context tags in said second set so that said first derived context data corresponds at least partially to an earlier time instance than said second derived context data. According to an embodiment, said first set comprises context tags corresponding to a longer time span compared to context tags in said second set so that said first derived context data corresponds to a longer time span than said second derived context data. According to an embodiment, the method comprises forming a codebook of sparse vectors, said sparse vectors corresponding to said context tags, and said sparse vectors having a high dimension with respect to the number of non-zero elements in said sparse vectors, using said codebook to form a first sparse context vector from said first set of context tags and a second sparse context vector from said second set of context tags, and using said first and second sparse context vectors to determine said difference. According to an embodiment, forming said codebook comprises forming random sparse vectors for documents, said documents comprising tags, adding a contribution to a codebook vector of a tag from those said sparse vectors for documents where said tag is present, and repeating said adding the contribution for a plurality of tags. According to an embodiment, the method comprises calculating a distance between said first and second sparse context vectors to determine said difference. According to an embodiment, the method comprises determining a first context from said first sparse context vector using said codebook. According to an embodiment, the method comprises determining a second context from said second sparse context vector using said codebook, and calculating a distance between said determined first context and said determined second context to determine said difference. According to an embodiment, said distance is calculated using at least one distance measure from the group of a Euclidean distance, a taxicab distance, a dot product and a Hausdorff distance. According to an embodiment, said tags comprise words from the group of common words, brand names, words in internet addresses and states from a sensor or application formed into words. According to an embodiment, at least one set of tags is formed or used by weighting the corresponding context information. According to an embodiment, said weighting is based on at least one of the group of time, the type of context associated with said tag at a time instance and an expectation value related to the context associated with said tag at a time instance. According to an embodiment, said controlling comprises setting application state based on said context change. According to an embodiment, said controlling comprises determining social media activity context and presenting relevant information to the user depending on said social media activity context.

According to a second aspect there is provided an apparatus comprising at least one processor, at least one memory including computer program code for one or more program units, the at least one memory and the computer program code configured to, with the processor, cause the apparatus to form a first set of context tags and a second set of context tags, said first set and said second set corresponding to a context of said apparatus, wherein said first set and said second set correspond to a different time span of said context of said apparatus, derive first derived context data from said first set and second derived context data from said second set, and determine a difference between said first derived context data and said second derived context data, determine that a change of context has occurred based on said difference, and control said apparatus in response to said determined change of context.

According to an embodiment, said first set comprises at least one context tag corresponding to an earlier time instance compared to context tags in said second set so that said first derived context data corresponds at least partially to an earlier time instance than said second derived context data. According to an embodiment, said first set comprises context tags corresponding to a longer time span compared to context tags in said second set so that said first derived context data corresponds to a longer time span than said second derived context data. According to an embodiment, the apparatus comprises computer program code configured to, with the at least one processor, cause the apparatus to form a codebook of sparse vectors, said sparse vectors corresponding to said context tags, and said sparse vectors having a high dimension with respect to the number of non-zero elements in said sparse vectors, use said codebook to form a first sparse context vector from said first set of context tags and a second sparse context vector from said second set of context tags, and use said first and second sparse context vectors to determine said difference. According to an embodiment, the apparatus comprises computer program code for forming said codebook, said code configured to, with the at least one processor, cause the apparatus to form random sparse vectors for documents, said documents comprising tags, add a contribution to a codebook vector of a tag from those said sparse vectors for documents where said tag is present, and repeat said adding the contribution for a plurality of tags. According to an embodiment, the apparatus comprises computer program code configured to, with the at least one processor, cause the apparatus to calculate a distance between said first and second sparse context vectors to determine said difference. According to an embodiment, the apparatus comprises computer program code configured to, with the at least one processor, cause the apparatus to determine a first context from said first sparse context vector using said codebook, determine a second context from said second sparse context vector using said codebook, and calculate a distance between said determined first context and said determined second context to determine said difference. According to an embodiment, said distance is calculated using at least one distance measure from the group of a Euclidean distance, a taxicab distance, a dot product and a Hausdorff distance. According to an embodiment, said tags comprise words from the group of common words, brand names, words in internet addresses and states from a sensor or application formed into words. According to an embodiment, at least one set of tags is formed or used by weighting the corresponding context information. According to an embodiment, said weighting is based on at least one of the group of time, the type of context associated with said tag at a time instance and an expectation value related to the context associated with said tag at a time instance. According to an embodiment, the apparatus comprises computer program code configured to, with the at least one processor, cause the apparatus to set application state based on said context change. According to an embodiment, the apparatus comprises computer program code configured to, with the at least one processor, cause the apparatus to determine social media activity context and present relevant information to the user depending on said social media activity context.

According to a third aspect there is provided a system comprising at least one processor, at least one memory including computer program code for one or more program units, the at least one memory and the computer program code configured to, with the processor, cause the system to form a first set of context tags and a second set of context tags, said first set and said second set corresponding to a context of said system, wherein said first set and said second set correspond to a different time span of said context of said system, derive first derived context data from said first set and second derived context data from said second set, and determine a difference between said first derived context data and said second derived context data, determine that a change of context has occurred based on said difference, and control said system in response to said determined change of context.

According to an embodiment, said first set comprises at least one context tag corresponding to an earlier time instance compared to context tags in said second set so that said first derived context data corresponds at least partially to an earlier time instance than said second derived context data. According to an embodiment, said first set comprises context tags corresponding to a longer time span compared to context tags in said second set so that said first derived context data corresponds to a longer time span than said second derived context data. According to an embodiment, the system comprises computer program code configured to, with the at least one processor, cause the system to form a codebook of sparse vectors, said sparse vectors corresponding to said context tags, and said sparse vectors having a high dimension with respect to the number of non-zero elements in said sparse vectors, use said codebook to form a first sparse context vector from said first set of context tags and a second sparse context vector from said second set of context tags, use said first and second sparse context vectors to determine said difference. According to an embodiment, the system comprises computer program code configured to, with the at least one processor, cause the system to form random sparse vectors for documents, said documents comprising tags, add a contribution to a codebook vector of a tag from those said sparse vectors for documents where said tag is present, and repeat said adding the contribution for a plurality of tags. According to an embodiment, the system comprises computer program code configured to, with the at least one processor, cause the system to calculate a distance between said first and second sparse context vectors to determine said difference. According to an embodiment, the system comprises computer program code configured to, with the at least one processor, cause the system to determine a first context from said first sparse context vector using said codebook, determine a second context from said second sparse context vector using said codebook, and calculate a distance between said determined first context and said determined second context to determine said difference. According to an embodiment, said distance is calculated using at least one distance measure from the group of a Euclidean distance, a taxicab distance, a dot product and a Hausdorff distance. According to an embodiment, said tags comprise words from the group of common words, brand names, words in internet addresses and states from a sensor or application formed into words. According to an embodiment, at least one set of tags is formed or used by weighting the corresponding context information. According to an embodiment, said weighting is based on at least one of the group of time, the type of context associated with said tag at a time instance and an expectation value related to the context associated with said tag at a time instance. According to an embodiment, the system comprises computer program code configured to, with the at least one processor, cause the system to set application state based on said context change. According to an embodiment, the system comprises computer program code configured to, with the at least one processor, cause the system to determine social media activity context and present relevant information to the user depending on said social media activity context.

According to a fourth aspect there is provided a computer program product including one or more sequences of one or more instructions which, when executed by one or more processors, cause a system to perform the method according to any of the embodiments of the first aspect.

According to a fifth aspect there is provided a computer program product including one or more sequences of one or more instructions which, when executed by one or more processors, cause a system to form a first set of context tags and a second set of context tags, said first set and said second set corresponding to a context of said system, wherein said first set and said second set correspond to a different time span of said context of said system, derive first derived context data from said first set and second derived context data from said second set, and determine a difference between said first derived context data and said second derived context data, determine that a change of context has occurred based on said difference, and control said system in response to said determined change of context.

According to a sixth aspect there is provided an apparatus comprising means for forming a first set of context tags and a second set of context tags, said first set and said second set corresponding to a context of said apparatus, wherein said first set and said second set correspond to a different time span of said context of said apparatus, means for deriving first derived context data from said first set and second derived context data from said second set, and means for determining a difference between said first derived context data and said second derived context data, means for determining that a change of context has occurred based on said difference, and means for controlling said apparatus in response to said determined change of context.

According to an embodiment, the apparatus comprises means for forming a codebook of sparse vectors, said sparse vectors corresponding to said context tags, and said sparse vectors having a high dimension with respect to the number of non-zero elements in said sparse vectors, means for using said codebook to form a first sparse context vector from said first set of context tags and a second sparse context vector from said second set of context tags, and means for using said first and second sparse context vectors to determine said difference. According to an embodiment, the apparatus comprises means for forming random sparse vectors for documents, said documents comprising tags, means for adding a contribution to a codebook vector of a tag from those said sparse vectors for documents where said tag is present, and means for repeating said adding the contribution for a plurality of tags. According to an embodiment, the apparatus comprises means for calculating a distance between said first and second sparse context vectors to determine said difference. According to an embodiment, the apparatus comprises means for determining a first context from said first sparse context vector using said codebook, means for determining a second context from said second sparse context vector using said codebook, and means for calculating a distance between said determined first context and said determined second context to determine said difference. According to an embodiment, the apparatus comprises means for setting application state based on said context change. According to an embodiment, the apparatus comprises means for determining social media activity context and means for presenting relevant information to the user depending on said social media activity context.

According to a seventh aspect there is provided a data structure for controlling the operation of a computer system, said data structure comprising sparse high-dimensional vectors associated with vocabulary words, said vocabulary words comprising at least three types of words from the group of common words, internet address words, brand names, user phonebook names and sensor value words.

According to an eighth aspect there is provided a use of human language words to indicate a hardware sensor state in a system for determining a context change.

DESCRIPTION OF THE DRAWINGS

In the following, various embodiments of the invention will be described in more detail with reference to the appended drawings, in which

FIG. 4a illustrates a system and method for forming a random index codebook for determining a context according to an embodiment;

DETAILED DESCRIPTION OF THE EMBODIMENTS

Figure 1:
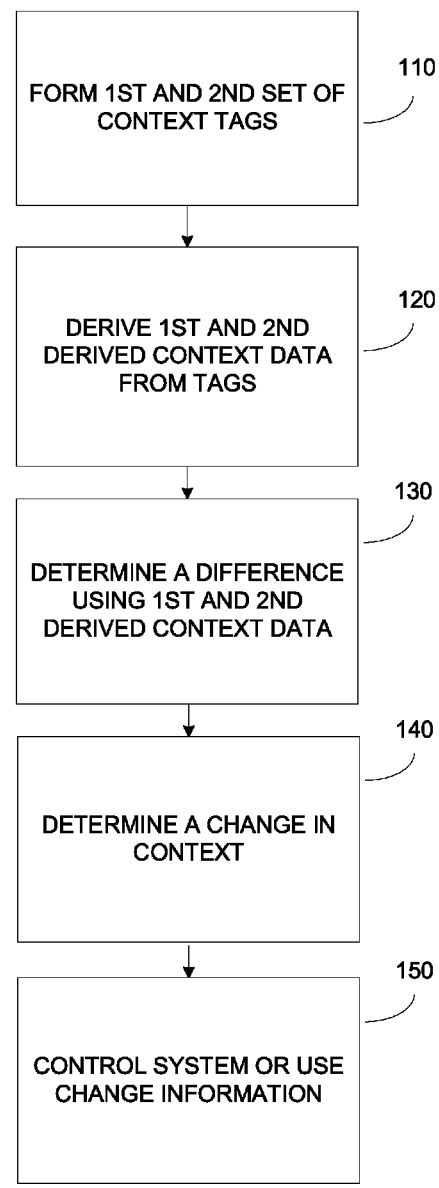
FIG. 1 shows a flow chart of a method for determining a context according to an embodiment.

In the following, several embodiments of the invention will be described with reference to contexts of a system as well as a framework of random indexing. It is to be noted, however, that the invention is not limited to these uses or alternatives. In fact, the different embodiments have applications in any environment where semantic processing is required.

As an example, a context processing system may be mapped to a lexical system of "words" and "documents". The documents may contain a set of words that define a single realization of a context, e.g. at a certain time instance.

Methods of distributional semantics can be classified broadly as either probabilistic or geometric.

Probabilistic models view documents as mixtures of topics, allowing terms to be represented according to the probability of their being encountered during the discussion of a particular topic. For example, Latent Semantic Analysis (LSA) uses the entire document as the context, by generating a term-document matrix in which each cell corresponds to the number of times a term occurs in a document. On the other hand, the Hyperspace Analog to Language (HAL) model uses the words surrounding the target term as the context, by generating a term-term matrix to note the number of times a given term occurs in the neighborhood of every other term. In contrast, Schütze's Wordspace defines a sliding window of around 1000 frequently-occurring four-grams as a context, resulting in a term-by-four-gram matrix. Usually, the magnitude of the term vectors depends on the frequency of occurrence of the terms in the corpus and the direction depends on the terms relationship with the chosen base vectors.

Geometric models, of which Random Indexing is an exemplar, may represent terms as vectors in multi-dimensional space, the dimensions of which are derived from the distribution of terms across defined contexts, which may include entire documents, regions within documents or grammatical relations.

A property of vector-space models may be that the semantic information is extracted automatically, in an unsupervised fashion from unstructured data. The models may require little or no preprocessing of data, and they may involve little or no human interaction. A term "vector-based semantic analysis" may be used to denote the practice of using statistical regularities in the data—for example co-occurrence information—to automatically construct the vectors and the vector space. As an example, no prior knowledge of the data is assumed, making the models easy to apply to data with different topical and structural properties.

Consequently, vector-space models are inherently adaptive when applied to new domains, since the dynamics of the semantic space will reflect the semantics of the training data. This means that different domains will produce different semantic spaces, with different semantic relations between different words. For example, if we train the model on a zoological database, "mouse" will most certainly be correlated with other words referring to, for example, small, furry animals or rodents, while if we train the model on documents with computer-related subjects, "mouse" will presumably be correlated with other words referring to, for example, computer hardware. As a matter for empirical validation, this feature may also make the models easily applicable to different languages.

A random index (RI) technique can be described as a two-step operation as follows. First, each context (e.g. each document or each word) in the data is assigned a unique and randomly generated representation called an index vector. These index vectors are sparse, high-dimensional, and ternary, which means that their dimensionality (d) is on the order of hundreds or thousands or more, and that they consist of e.g. a small number of randomly distributed +1s and −1s or other small numbers, with the rest of the elements of the vectors set to zero. Then, context vectors are produced by scanning through the text, and each time a word occurs in a context (e.g. in a document, or within a sliding context window), that context's d-dimensional index vector is added to the context vector for the word in question. Words are thus represented by d-dimensional context vectors that are effectively the sum of the words' contexts.

For illustration, consider the sentence 'A friend in need is a friend indeed'. Let the dimension of the index vector be 10, and the context be defined as one preceding and one succeeding word. Let 'friend' be assigned a random index vector: [0 0 0 1 0 0 0 0 −1 0], and 'need' be assigned a random index vector: [0 1 0 0 −1 0 0 0 0 0]. Then to compute the context vector of 'in', RI sums up the index vectors of its context. Since the context is defined as one preceding and one succeeding word, the context vector of 'in' is the sum of index vectors of 'friend' and 'need', and is equal to [0 1 0 1 −1 0 0 0 −1 0].

FIG. 1 shows a flow chart of a method for determining a context according to an embodiment. In phase 110, a first set of context tags and a second set of context tags are formed. The first set and second set correspond to a context of a system so that the first set comprises tags describing the context in a first time span and the second set comprises tags describing the context in a second time span. The first and second time spans are different, and/or the tags have been chosen so that they describe a different time span of contexts of a system. This can be done so that the context of a system is determined at different—regular or irregular—time instances, and the context is at each time instant described by words. These words are then collected, and duplicates may be removed. The first set of tags (words) is formed by collecting e.g. the words describing the contexts over a longer time span, e.g. 10 time instances. The second set of tags is formed by collecting e.g. the words describing the contexts over a short time span e.g. of 2 time instances. The time instances may or may not be partially or completely overlapping. It needs to be understood that there may also be a higher number (such as 3, 4, 5 or more) of sets of tags formed in this manner.

In phase 120, first derived context data from the first set and the second derived context data from said second set are formed. That is, each set of tags is used to derive a derived context or predicted context, or information representative thereof. For example, a random index vector may be computed for the set of tags from random index vectors of the tags (words) e.g. by summing.

In phase 130, a difference between the first derived context data and the second derived context data may be determined. This may happen e.g. by computing a distance using the random index vectors of the sets of tags. Computing the distance may comprise first determining the representative context by using the random index vector of each set of tags, and then computing a distance (e.g. Euclidean or dot product) between the representative contexts (or their random index vectors).

In phase 140, it may be determined that a change of context has occurred based on the difference. This may happen so that the first set of tags represents contexts over a longer time span, e.g. further back in time from the present moment, and the second set of tags represents contexts over a short time span close to the present moment. In this manner, a derived context based on the second set of tags may reflect a change in context faster than the derived context based on the first set of tags.

In phase 150, the system may be controlled in response to the determined change of context. For example, applications and their state may be altered, or information processing may be controlled by the determined change in context. As an example, if it is determined that the context changes from a situation where a person is at work indoors to a situation where the person is walking outdoors towards a bus stop to catch a bus, the applications of the system may be altered so that at work, the e-mail application is displayed, and when the context has changed, a browser is brought up to display the bus time table and/or a navigation application shows the map of the town with the distance and instructions to the bus stop.

Using a random index method for determining the change in context may offer advantages for example as follows.

A random index method may be used in an incremental manner, which means that the context vectors can be used for similarity computations even after just a few examples have been encountered. The dimensionality d of the vectors is a parameter in the method, which means that means that d does not need to change once it has been set; new data increases the values of the elements of the context vectors, but not their dimensionality. Avoiding the increasing dimensionality may avoid scalability problems that are often present in other word space methods. That is, working with e.g. excessively large matrices may be avoided. A random index method may offer implicit dimension reduction, since the fixed dimensionality d may be much lower than the number of possible contexts c in the system. This may lead to a gain in processing time and lower memory consumption as compared to word space methods that employ computationally expensive dimension reduction algorithms. A random index method may be used with different types of context. Other word space models typically use either documents or words as contexts. RI is not limited to these naive choices, but can be used with different types of contexts.

A RI method may learn user's individual behavior features and references. The individual information cannot be opened by other users, i.e., data is in a "secret" format. An RI method can process temporal multimodal data and make semantic description of data in real time. A predictive RI method may process temporal serial type of data and make semantic description of data in real time. The switching of different context descriptions may be fast.

Figure 2A:
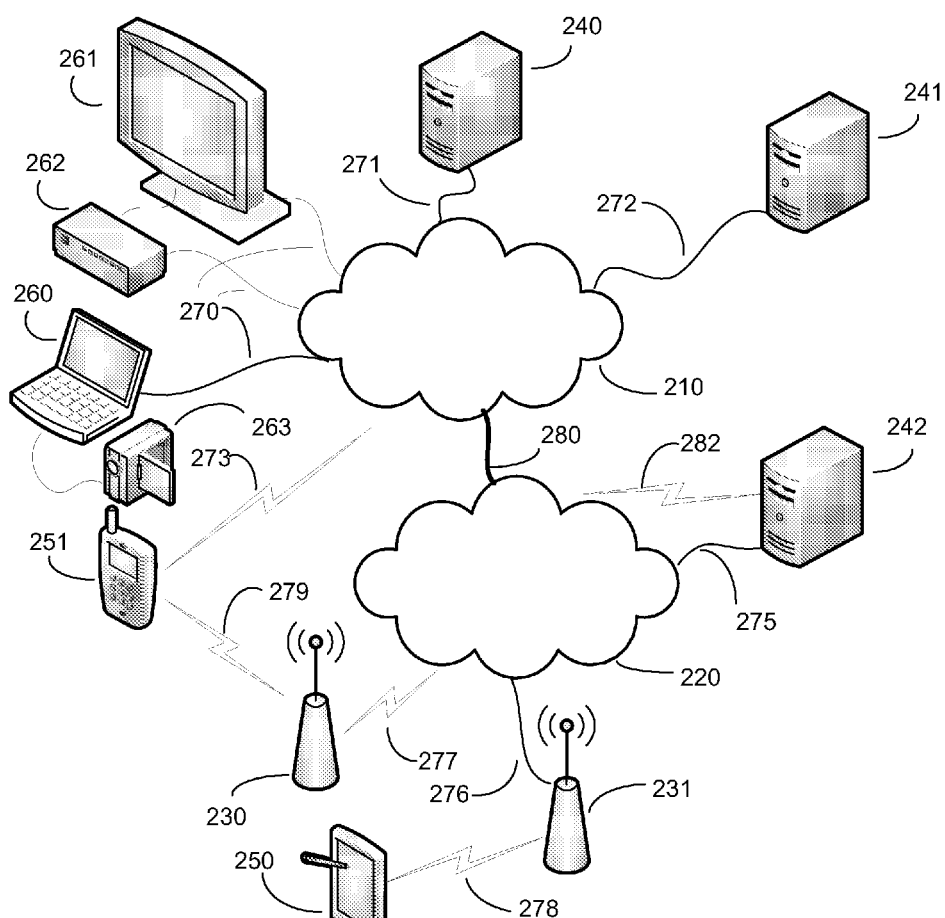
FIGS. 2a and 2b show a system and devices for determining a context according to an embodiment.
Figure 2B:
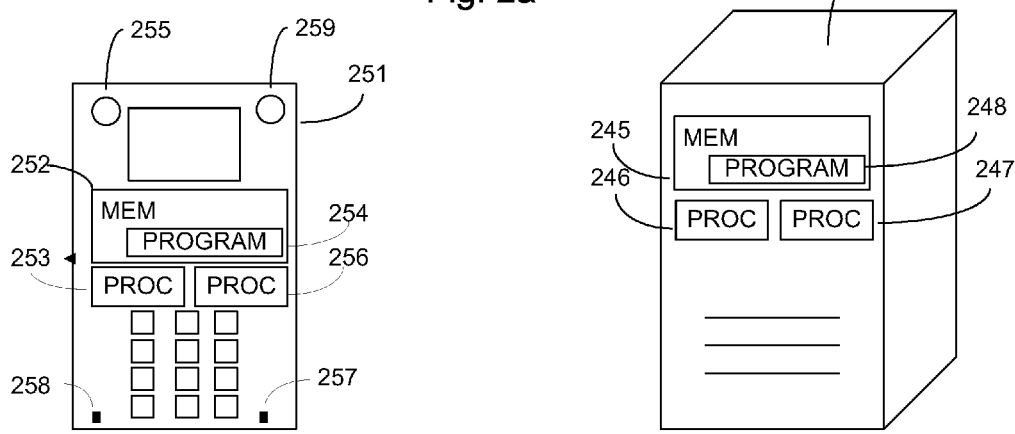

FIGS. 2a and 2b show a system and devices for determining a context according to an embodiment. The context may be determined in a single device, in a plurality of devices connected to each other or e.g. in a network service framework with one or more servers and one or more user devices.

In FIG. 2a, the different devices may be connected via a fixed network 210 such as the Internet or a local area network; or a mobile communication network 220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks are connected to each other by means of a communication interface 280. The networks comprise network elements such as routers and switches to handle data (not shown), and communication interfaces such as the base stations 230 and 231 in order for providing access for the different devices to the network, and the base stations 230, 231 are themselves connected to the mobile network 220 via a fixed connection 276 or a wireless connection 277.

There may be a number of servers connected to the network, and in the example of FIG. 2a are shown a server 240 for providing a network service such as a social media service and connected to the fixed network 210, a server 241 for providing a network service and connected to the fixed network 210, and a server 242 for providing a network service and connected to the mobile network 220. Some of the above devices, for example the servers 240, 241, 242 may be such that they make up the Internet with the communication elements residing in the fixed network 210. The various servers and user devices may store e.g. a codebook matrix comprising sparse vectors corresponding to words.

There are also a number of end-user devices such as mobile phones and smart phones 251, Internet access devices (Internet tablets) 250, personal computers 260 of various sizes and formats, televisions and other viewing devices 261, video decoders and players 262, as well as video cameras 263 and other encoders such as digital microphones for audio capture. These devices 250, 251, 260, 261, 262 and 263 can also be made of multiple parts. The various devices may be connected to the networks 210 and 220 via communication connections such as a fixed connection 270, 271, 272 and 280 to the internet, a wireless connection 273 to the internet 210, a fixed connection 275 to the mobile network 220, and a wireless connection 278, 279 and 282 to the mobile network 220. The connections 271-282 are implemented by means of communication interfaces at the respective ends of the communication connection.

FIG. 2b shows devices where determining the context may be carried out according to an example embodiment. As shown in FIG. 2b, the server 240 contains memory 245, one or more processors 246, 247, and computer program code 248 residing in the memory 245 for implementing, for example, the functionalities of a software application like a social media service. The different servers 240, 241, 242 may contain at least these same elements for employing functionality relevant to each server. Similarly, the end-user device 251 contains memory 252, at least one processor 253 and 256, and computer program code 254 residing in the memory 252 for implementing, for example, the functionalities of a software application like a browser or a user interface of an operating system. The end-user device may also have one or more cameras 255 and 259 for capturing image data, for example video. The end-user device may also contain one, two or more microphones 257 and 258 for capturing sound. The end-user devices may also have one or more wireless or wired microphones attached thereto. The different end-user devices 250, 260 may contain at least these same elements for employing functionality relevant to each device. The end user devices may also comprise a screen for viewing a graphical user interface.

It needs to be understood that different embodiments allow different parts to be carried out in different elements. For example, execution of a software application may be carried out entirely in one user device like 250, 251 or 260, or in one server device 240, 241, or 242, or across multiple user devices 250, 251, 260 or across multiple network devices 240, 241, or 242, or across both user devices 250, 251, 260 and network devices 240, 241, or 242. For example, the capturing of user input through a user interface may happen in one device, the data processing and providing information to the user may happen in another device and the control and management of context processing may be carried out in a third device. The different application elements and libraries may be implemented as a software component residing on one device or distributed across several devices, as mentioned above, for example so that the devices form a so-called cloud. A user device 250, 251 or 260 may also act as web service server, just like the various network devices 240, 241 and 242. The functions of this web service server may be distributed across multiple devices, too.

The different embodiments may be implemented as software running on mobile devices and optionally on devices offering network-based services. The mobile devices may be equipped at least with a memory or multiple memories, one or more processors, display, keypad, motion detector hardware, and communication means such as 2G, 3G, WLAN, or other. The different devices may have hardware like a touch screen (single-touch or multi-touch) and means for positioning like network positioning or a global positioning system (GPS) module. There may be various applications on the devices such as a calendar application, a contacts application, a map application, a messaging application, a browser application, a gallery application, a video player application and various other applications for office and/or private use.

Figure 3:
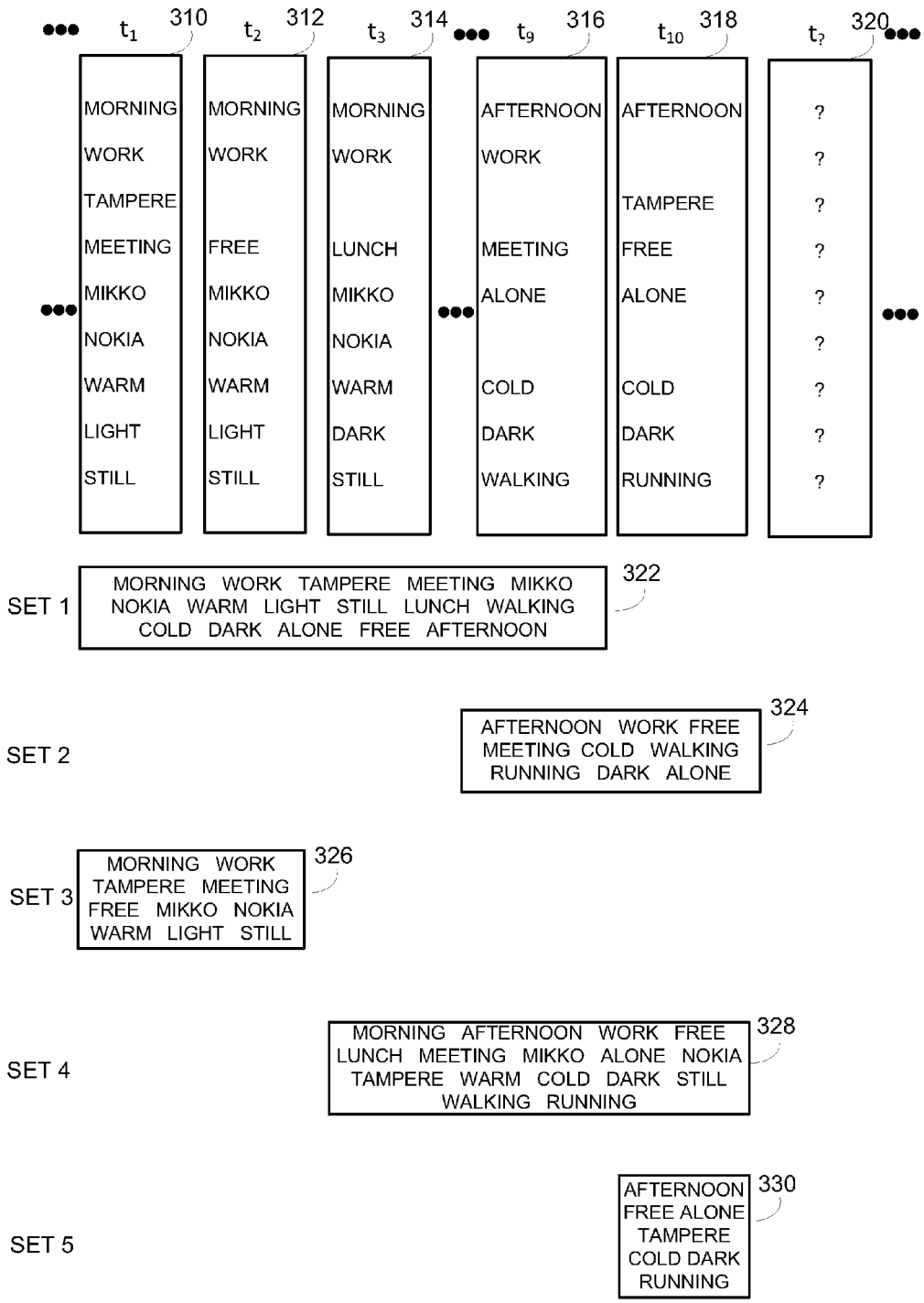
FIG. 3 shows a system for determining a future context from earlier context information according to an embodiment.

FIG. 3 shows a system for determining a future context from earlier context information according to an embodiment. A sequence of events 310, 312, 314, . . . , 316, 318 is shown, where each event is represented by a context. The context is described by words such as morning, work, Tampere, meeting, Mikko, Nokia, warm, light and still for the event 310. As time passes, the context may change a little, e.g. the "meeting" may change to "free" between the event 310 at time t1 and the event 312 at time t2, or the context may change a lot or completely, e.g. comparing context of event 318 at time t10 to the context of event 310. The words describing the context may come from different sources such as the time (clock) of the system (morning), location information (Tampere), available communication networks (Nokia), calendar contents (meeting), other devices around the system and their owners (Mikko), sensor readings such as thermometer, ambient light sensor and acceleration sensor (warm, light, still). When the moves from one activity to another, the context may change, and correspondingly, the words describing the context may change. Some information may be available at some time and not available at other times. That is, the available context information may vary.

It has been realized here that in order to adapt the user interface of a system or the states of applications on the system, it is useful to have a prediction of what the next (future) context 320 will be, or that a context change has occurred (between contexts 314 and 316).

According to an embodiment, a context change may be detected by sensing a difference between two or more sets of context tags, where the sets represent a different time span of events. For example, SET 1 (322) represents the time span of t1 to t9, and comprises context words collected from the events 310, 312, 314, . . . and 316. SET 2 (324) represents the time span of t9 to t10, SET 3 (326) the time span of t1 to t2, SET 4 (328) the time span of t3 to t10 and SET 5 (330) the time span of t10, that is, one time instance only. The sets may overlap like SET 1 and SET 2, or they may be separate like SET 2 and SET 3. The sets may have the same end time like SET 2 and SET 4 and/or the same start time like SET 1 and SET 3. A set may be a subset of another set like SET 5 is a subset of SET 4. Alternatively or in addition, the different sets may be formed by determining context words corresponding to time instances with a first frequency f1 to the first set and context words corresponding to time instances with a second frequency f2 to the second set. In such a way, the time spans of the two sets may be different even though their first time instance and last time instance were the same.

The sets 322, 324, 326, 328 and 330 may be formed by simply collecting the tags from different events each set represents. At this point, duplicates of tags may be removed. Alternatively or in addition, the tags may be weighted so that some tags occur more often in the set than others or so that when the set is used, some tags receive a higher weight. The weighting may happen e.g. so that earlier events receive a smaller weight than events at more recent time instance. The weighting may be based on the tags themselves e.g. so that tags that have high certainty, because they have for example been inputted by the user or are otherwise known to be right with high probability, receive a higher weight and occur multiple times in the set. The weighting may be based on the type of the context the tag represents, e.g. sensor information like thermometer may receive a low weight while information from the user's calendar may receive a high weight. Weighting may happen also at the time of using the set of words, for example so that a coefficient such as a floating point coefficient is used to multiply the elements of the corresponding sparse vectors.

When the sets have been formed, a difference between two or more sets may be determined. For example, it can be seen from FIG. 3 that SET 1 and SET 2 have some common tags (work, meeting), while most tags are different. At the same time, SET 1 and SET 3 have most tags in common. When two sets have differing tags and are different enough, it can be determined that the sets represent different contexts. For example, when a longer set like SET 1 represents contexts that are related to working at the office, and a more recent and shorter SET 2 represents contexts that are related to travelling home, the sets comprise different words and a difference between the sets indicates that a context change has occurred. For detecting a context change, for example a set representing the last 5 or 10 contexts may be used as one set and a set representing the last 2 contexts may be used as the other set. A distance measure may be used to calculate a distance between the two sets to determine the difference. For example, random indexing methods may be used to determine the difference, as will be explained with reference to FIGS. 4a, 4b and 5. As can be understood, more than 2 sets can be used, for example 3, 4 or 5 as in the figure, or even more.

FIG. 4a illustrates a system and method for forming a random index codebook for determining a context according to an embodiment. First a large number, e.g. thousands or tens of thousands or even more, of contexts 410, 412, 414 are taken as the training set. The contexts may be events like in FIG. 3, or some other documents or collections of tags or words formed in any other way that somehow represents that certain tags or words have a tendency of coming up together in an event or a context. Next, each context is assigned a sparse context vector. This assignment may happen randomly, e.g. by assigning 10 values of 1 and 10 values of −1 to random elements of the vector. The vectors can have a length of e.g. 100, 500, 1000, 5000, 10000, 20000 or 100000 elements. Only a few of the elements are non-zero, e.g. one of every 100 or 1000 elements (as a ratio), that is, the vectors are sparse. The vectors may be called random index vectors.

When the contexts have been assigned context vectors 416, 418, 420, the sparse vectors (RI vectors) for each tag or word are formed. This may happen as follows. Let us take as examples the words/tags DAY, FREE and WARM. Whenever a word is present in a context, the random index vector of the context is added to the sparse tag vector (422, 424 or 426). For example, the word DAY is present in context 1 and in context 3, and therefore the RI vectors 416 and 420 are added to form the sparse tag vector 422. The combining or adding may happen simply by summation element by element, or weighting may be applied. Likewise, the tag WARM is present only in context 2, and its RI vector 424 therefore becomes the same as the context 2 RI vector 418. Similarly, the word WARM is present in contexts 2 and 3, and its RI vector 426 becomes the combined/summed vector of vectors 424 and 426. These sparse tag vectors form the word/tag codebook where each tag has a corresponding high-dimensional sparse tag vector (422, 424, 426). It needs to be understood that these vectors may comprise elements that are larger in absolute value than 1, because several contexts may have a value at a certain element position, and when their vectors are summed, the sum grows larger than 1 in absolute value.

Figure 4B:
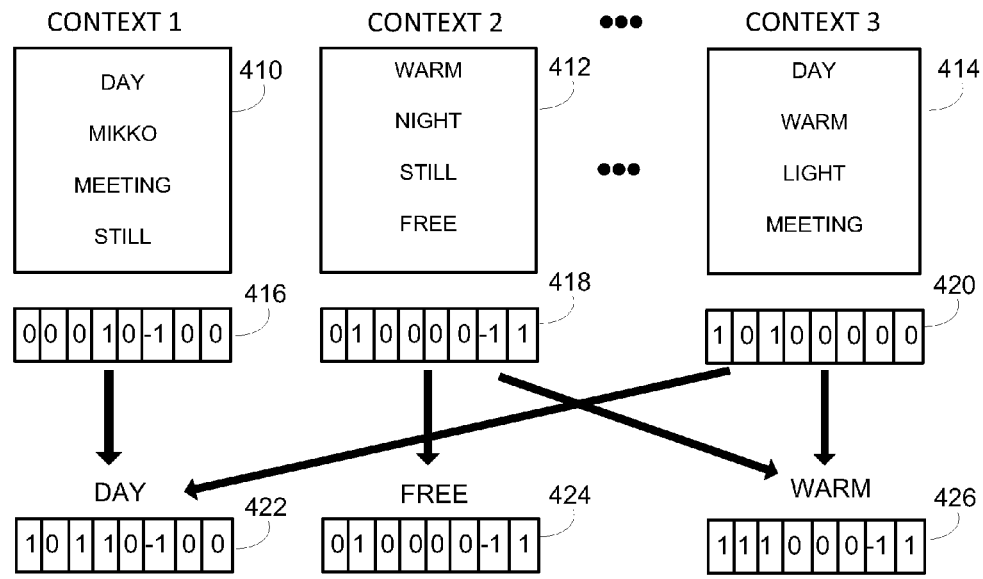
FIG. 4b illustrates another system and method for forming a random index codebook for determining a context according to an embodiment.
Figure 4B:
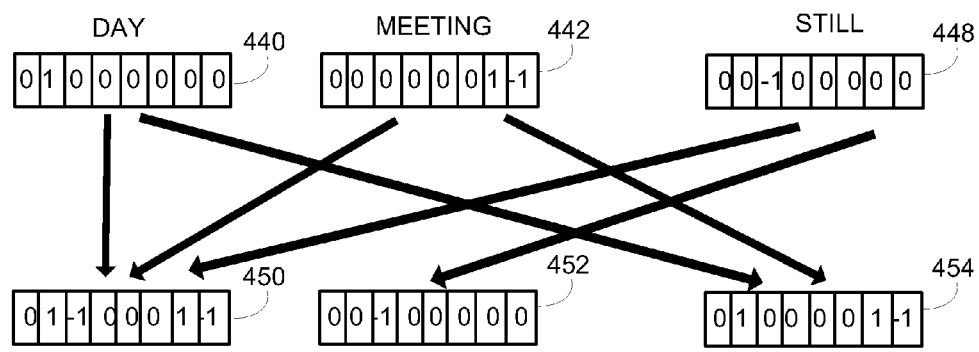
Figure 4B:
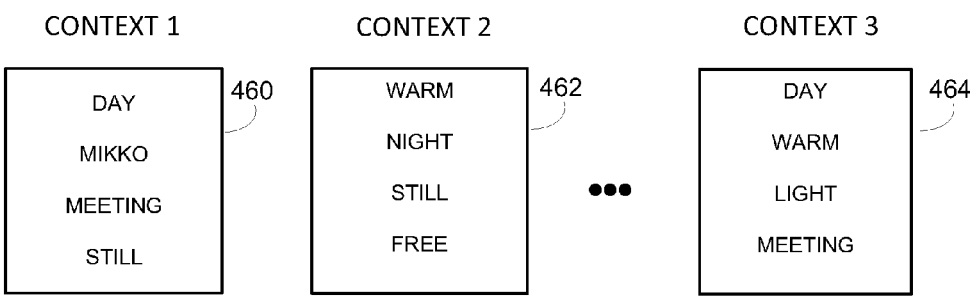

FIG. 4b illustrates another system and method for forming a random index codebook for determining a context according to an embodiment. As explained earlier, the context RI vectors may be formed in a random manner by assigning a few non-zero elements to a high-dimensional vector. The sparse context vectors may also be formed in a similar fashion as the codebook vectors in FIG. 4a. That is, first the words of a vocabulary are assigned random index (RI) vectors 440, 442, 448 (sparse vectors with a few 1 or −1 elements). Then, the sparse context vector 450, 452, 454 is obtained by combining the RI vectors of those words that are present in the context. For example, the sparse context vector 454 of context 3 is formed as a combination (e.g. sum) of vectors of DAY 440 and MEETING 442. The obtained sparse context vectors 450, 452, 454 may then be used in forming the codebook as explained with FIG. 4a.

In FIGS. 4a and 4b, for example, one or more auxiliary words may be generated based on one or more original words. Using the auxiliary word instead of the original word or in addition the original word may sometimes be more useful when updating the sparse vectors of the codebook matrix and/or when making a prediction. The original word may be e.g. a string "2 Jan. 2012 09:03". In principle, another substantially string "2 Jan. 2012 09:04" would be interpreted to a completely different word. This might reduce the efficiency of updating and determining a distance/difference.

The aim of the updating operations might be e.g. to gather co-occurrence data, which allows predicting actions, which are likely to be executed in a certain day of a week. For this aim, the original word "2 Jan. 2012 09:03" may be replaced or supplemented with an auxiliary word T5, which specifies the day of the week (Monday) corresponding to the date 2 Jan. 2012. The auxiliary word may be determined from the original word e.g. by using a calendar.

The time expression contained in the original word "2 Jan. 2012 09:03" might have too high temporal resolution for some purposes. For example, if the aim is to predict what would be a suitable time to start e.g. a virus scanning application (which will consume battery power and data processing resources), an auxiliary word may be determined such that the auxiliary word represents the clock time with a lower resolution (e.g. "morning") from the original word "2 Jan. 2012 09:03". The auxiliary word may be provided e.g. by using a dictionary and/or by using a quantizer (classifier).

For example, the following words may be used to represent time:
time://late night (to represent times from 00:16 to 04:00)
time://early morning (to represent times from 04:01 to 06:00)
time://morning (to represent times from 06:01 to 11:45)
time://noon (to represent times from 11:46 to 12:15)
time://afternoon (to represent times from 12:16 to 17:00)
time://early evening (to represent times from 17:01 to 19:00)
time://evening (to represent times from 19:01 to 23:45)
time://midnight (to represent times from 23:46 to 0015)

The original word may specify e.g. location. The location may be specified e.g. by using GPS coordinates and/or by providing a name of a location. One or more auxiliary words specifying a location may be determined from the original word e.g. by using an electronic map. For example, a first device of the system 500 may be located in a place called as "Vantaa" (in Finland), and a second device of the system 500 may be located in a place called as "Espoo" (in Finland). For example, an auxiliary word "Southern Finland" or "Capital area of Finland" may be determined from the word "Vantaa" e.g. by using an electronic map or a location dictionary. For example, an auxiliary word "Southern Finland" or "Capital area of Finland" may be determined from the word "Espoo" e.g. by using an electronic map or a location dictionary. The electronic map may be e.g. downloaded from the internet. The one or more auxiliary words may be provided by a remote (internet) service.

Thanks to the common auxiliary word, the co-occurrence data gathered by the first device may be used provide a prediction relevant to the user of the second device.

The user of the system may also associate a location with a name. For example, a portable device carried by the user may determine its location e.g. by a GPS navigation unit, and the device may also ask the use to give a name for the detected location. The name given by the user may be subsequently used as the word associated with said (GPS) location. The name may be e.g. "home", "school", "university", or "working place". Also a broader uniform resource locator (URL) may be determined based on a narrower uniform resource locator. In particular, a broader uniform resource locator of the internet may be determined based on a narrower uniform resource locator of the internet.

One or more auxiliary words may be formed from the original word by tokenizing and/or parsing. The auxiliary word or words may be used in a set instead of or in addition to using the original words.

Figure 5:
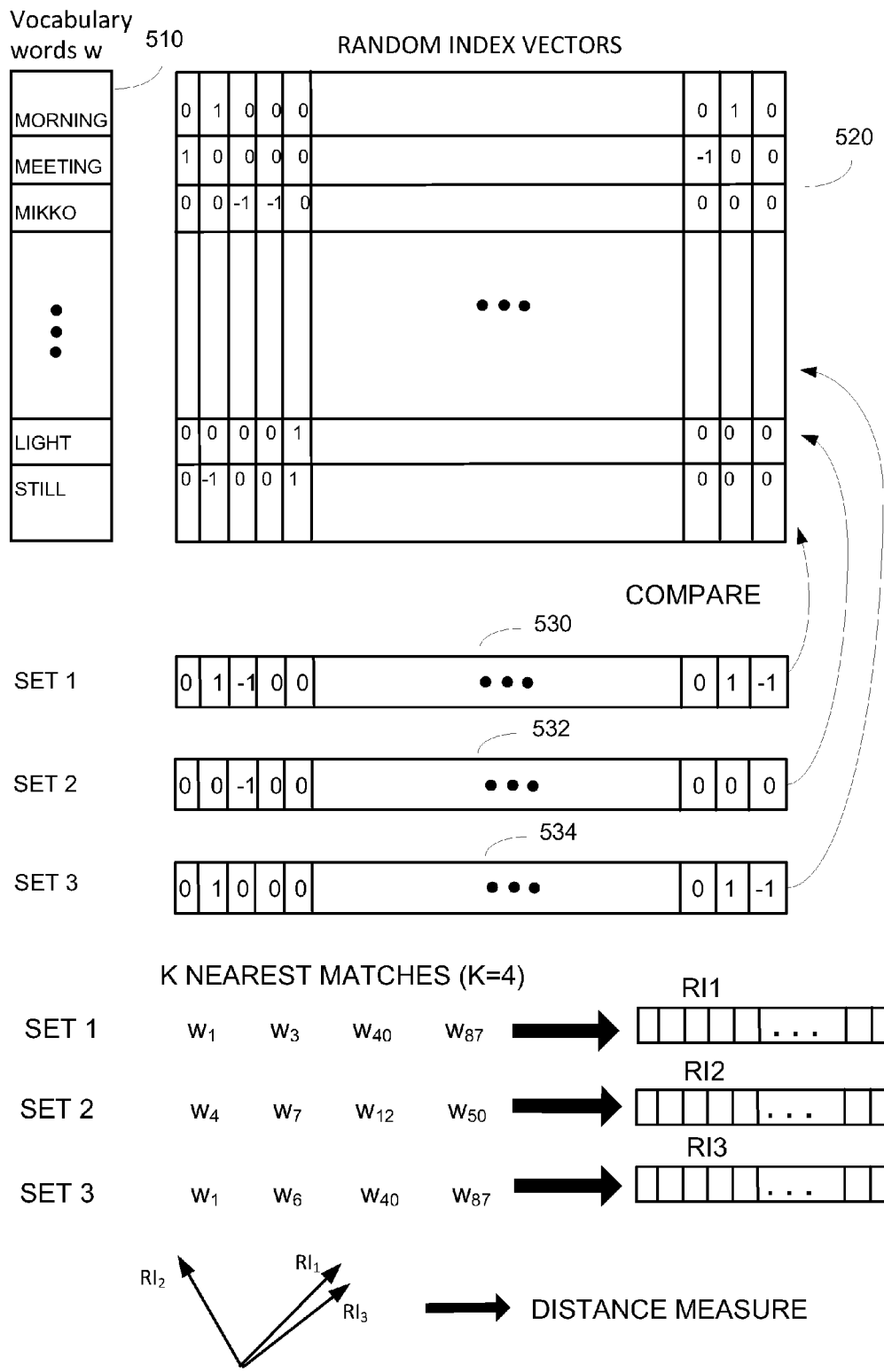
FIG. 5 shows a data structure and a system and a method for using the data structure for determining a future context using random indexing.

FIG. 5 shows a data structure and a system and a method for using the data structure for determining a future context using random indexing. As explained with FIG. 4a, each tag/word of a vocabulary 510 has an associated sparse tag vector in the codebook 520 (RANDOM INDEX VECTORS). A property of the codebook may be that while different words/tags have different vectors, words that are semantically close to each other have more similar vectors (with a smaller distance in between) than words that are semantically far apart. This property may have been achieved by the training according to FIG. 4a. The codebook 520 may be represented as a data structure that can be used in controlling the operation of the computer system, i.e. the values in the codebook determine how the system behaves.

As explained, the codebook may comprise sparse tag vectors formed by training. The sparseness of the vectors is to be understood to be such that trained patterns may be identified from the codebook by comparing an input sparse vector with a codebook vector. A high number of elements in a codebook vector may be zero or close to zero in value. The codebook vectors may present distinct patterns from the training sparse vectors. In this sense, the codebook may have high variation in element values of the codebook vectors, even though a large number of the elements of the codebook vectors may deviate from zero.

As explained with FIG. 3, each set of tags comprises tags from those contexts it represents. Consequently, the tags of a set of tags may be used to form a sparse tag set vector or RI vector for the set. For example, the sets 1, 2 and 3 of FIG. 3 have associated sparse tag set vectors 530, 532 and 534 that have been formed as combinations of the sparse tag vectors of the tags comprised in each set. The combination may be summing, and weighting may be used as explained earlier. These sparse tag set vectors may be used to determine the difference between the tag sets as follows.

First, a number of closest sparse vectors from the codebook are found for a sparse tag set vector 530, 532, 534. This may be done by using a distance measure such as Euclidean distance, dot product, taxicab distance (L1 norm), Hausdorff distance or any other distance measure that indicates the similarity between two sparse vectors. When a number (say k, e.g. k=4) of closest vectors have been found from the codebook, these closest vectors may again be used to form an RI context vector RI1, RI2, RI3 by combination, e.g.

summing. For example, the words w1, w3, w40 and w87 may have codebook vectors that are closest to the sparse tag set vector 530.

These RI1, RI2, RI3 vectors may be understood to represent a single context that best corresponds to the set of tags for which it has been formed. Next, the context vectors RI1, RI2, RI3 may be used to determine a distance between two sets of tags. This may be done as shown in the arrow (vector) illustration of FIG. 5 at the bottom. When two context vectors for two sets are close to each other in distance with some distance measure (see above), it may be determined that the sets represent the same or nearby context, and a context change has not occurred (e.g. RI1 and RI3). When two context vectors have a large distance from each other (as for RI1 and RI2), it may be determined that the corresponding sets represent different contexts and that a context change has occurred between the time spans represented by the sets (see FIG. 3 for the time spans of sets 1, 2 and 3).

Alternatively or in addition, the sparse tag set vectors 530, 532 and 534 may be used directly to determine a distance or similarity between two vectors (e.g. 530 and 532) so that a difference between two sets may be determined.

Alternatively or in addition, the words w may be used to determine a distance or similarity between two vectors (e.g. 530 and 532) so that a difference between two sets may be determined. For example, the group words w1, w3, w40 and w87 corresponding to SET 1 may be determined to be close to the group of words w1, w6, w40 and w87 corresponding to SET 3, because the groups have three out of four words in common. The order of words in the groups may or may not be taken into account in the determination.

Using random index methods for determining the context change may have advantages and technical effects, for example as follows. Fast real-time context computation may be possible, because determining the similarity of sets may be arranged to be computationally lighter and simpler than with other methods. The method may also be of general purpose for different applications, because different kinds of contexts and systems may be represented by words/tags as in FIG. 3. For these reasons, the method may be implemented into embedded systems as like as mobile phones, where a user's individual behavior features and references may be learned. The method may also simplify processing temporal serial (longitudinal) data. The codebook 520 may comprise the trained information in a robust manner distributed across rows and columns so that learned patterns can be reliably retrieved even if some data is lost or corrupt. Adding documents—i.e., including new data like new events—may be simple, and this can go on into millions of documents without needing to increase the number of columns in the codebook matrix (the dimensionality of the vectors). The method may also have the benefit that the codebook vectors may capture meaning, in that words with similar meaning may have similar codebook vectors and unrelated words have dissimilar vectors.

To sum up, high-dimensional random vectors—that is, large random patterns—may serve as the basis of a cognitive code that captures regularities in data. The simplicity and flexibility of random-vector methods may surpass those of more exact methods, and the principles may apply to a wide range of tasks. The method may be particularly apt for situations where data keep on accumulating.

Figure 6:
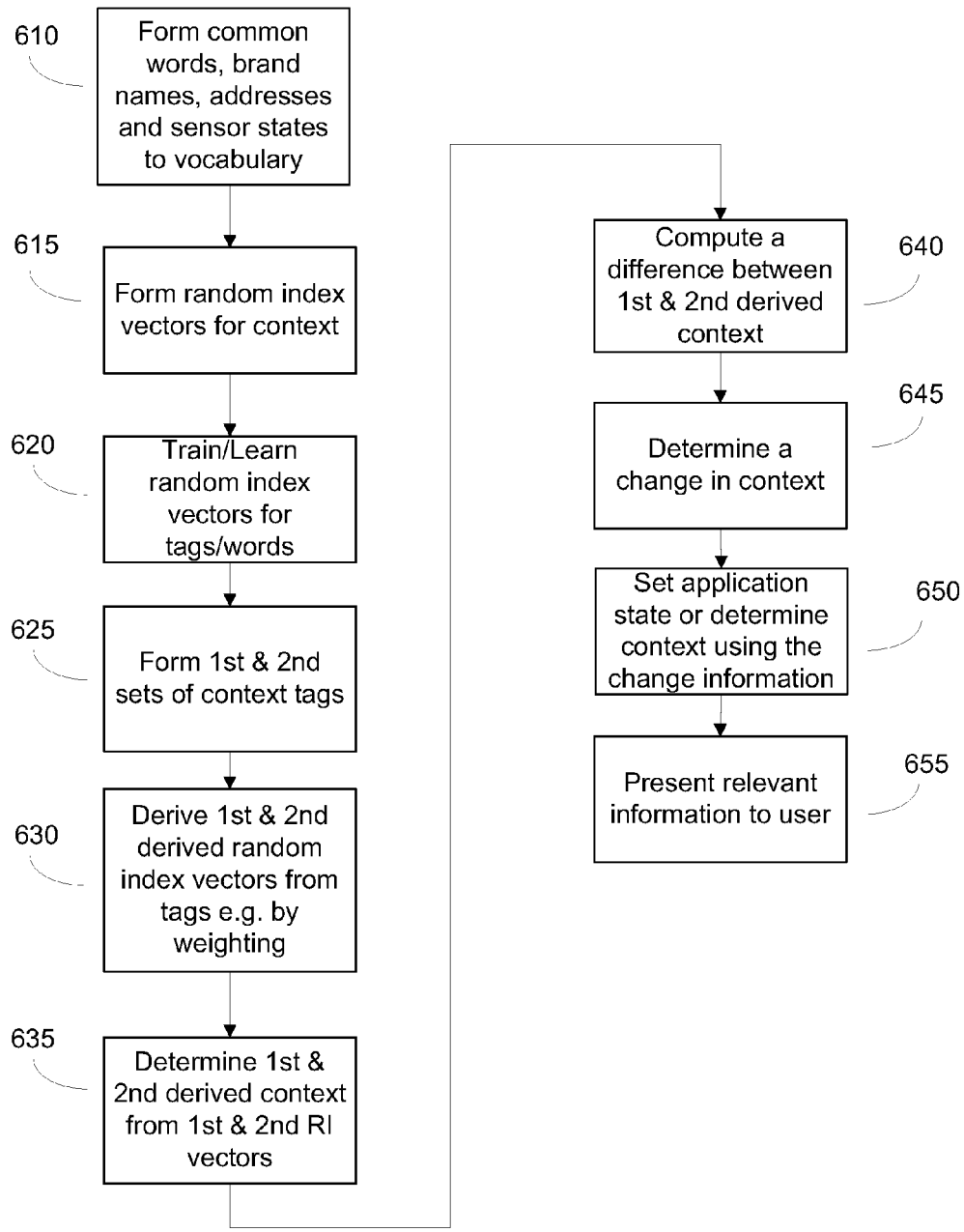
FIG. 6 shows a flow chart of a method for determining a future context using random indexing according to an embodiment.

FIG. 6 shows a flow chart of a method for determining a future context using random indexing according to an embodiment. In phase 610, a vocabulary may be formed from common words, internet addresses (or words therein), from sensor states (hot, cold, morning, afternoon, home) and other special words like brand names and names in the user's phone book. As explained with FIG. 4b, random index vectors may be assigned to training contexts in phase 615, and these may be used (as with FIG. 4a) for forming a codebook of RI vectors (sparse vectors) for tags/words in phase 620.

In phase 625, a first set of context tags and a second set of context tags are formed. The first set and second set correspond to a context of a system so that the first set comprises tags describing the context in a first time span and the second set comprises tags describing the context in a second time span, as shown in FIG. 3. The first and second time spans are different, and/or the tags have been chosen so that they describe a different time span of contexts of a system. This can be done so that the context of a system is determined at different—regular or irregular—time instances, and the context is at each time instant described by words. These words are then collected, and duplicates may be removed, and/or weighting may be performed as presented earlier.

In phase 630, first derived random index vectors from the first set and the second derived random index vectors from said second set are formed, e.g. by weighting, in a manner shown in FIG. 5. That is, each set of tags is used to derive a derived context or predicted context, or information representative thereof. For example, a random index vector (sparse tag set vector) may be computed for each set of tags from random index vectors of the tags (words) e.g. by summing. In phase 635 a first and second derived context may be determined as explained with FIG. 5 and RI vectors (RI1, RI2, RI3 in FIG. 5) may be formed.

In phase 640, a difference between the first derived context and the second derived context may be determined. This may happen e.g. by computing a distance using the random index vectors of the derived contexts as explained in FIG. 5. In other words, computing the distance may comprise first determining the representative context by using the random index vector of each set of tags, and then computing a distance (e.g. Euclidean or dot product) between the representative contexts (or their random index vectors).

In phase 645, it may be determined that a change of context has occurred based on the difference. This may happen so that the first set of tags represents contexts over a longer time span, e.g. further back in time from the present moment, and the second set of tags represents contexts over a short time span close to the present moment. In this manner, a derived context based on the second set of tags may reflect a change in context faster than the derived context based on the first set of tags. When the contexts formed from different sets are different or distant, a context change is determined to have happened.

In phase 650, the system may be controlled in response to the determined change of context. For example, applications and their state may be altered, or information processing may be controlled by the determined change in context. Based on the context change, different relevant information may be displayed to the user in phase 655. As an example, if it is determined that the context changes from a situation where a person is at work indoors to a situation where the person is walking outdoors towards a bus stop to catch a bus, the applications of the system may be altered so that at work, the e-mail application is displayed, and when the context has changed, a browser is brought up to display the bus time table and/or a navigation application shows the map of the town with the distance and instructions to the bus stop.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment. A data structure may be formed so that when the data structure is used in a computer with a computer program for controlling the same, the data structure causes the computer program and the computer to operate according to the data structure and the underlying data.

It is obvious that the present invention is not limited solely to the above-presented embodiments, but it can be modified within the scope of the appended claims.

The invention claimed is:

1. A method, comprising:
forming, by at least one processor of a device, a first set of context tags and a second set of context tags, said first set and said second set corresponding to a context of said device, wherein said first set comprises at least one context tag in a first time span of said device and said second set comprises at least one context tag in a second time span of said device,
forming, by the at least one processor of the device, a codebook of sparse vectors, said sparse vectors corresponding to said first set of context tags and said second set of context tags, wherein said sparse vectors have a high dimension with respect to a number of non-zero elements in said sparse vectors,
using said codebook to form a first sparse context vector from said first set of context tags and a second sparse context vector from said second set of context tags, wherein forming said codebook comprises:
forming random sparse vectors for documents, said documents comprising tags,
adding a contribution to a codebook vector of a tag from those said sparse vectors for documents where said tag is present, and
repeating said adding the contribution for a plurality of tags,
deriving, by the at least one processor of the device, first derived context data from said first set and second derived context data from said second set,
determining, by the at least one processor of the device, a difference between said first derived context data and said second derived context data using said first sparse context vector and said second sparse context vector,
determining, by the at least one processor of the device, that a change of context has occurred based on said difference, and
controlling, by the at least one processor of the device, said device in response to said determined change of context, wherein said second derived context data reflect a change in said context faster than said first derived context data.

2. A method according to claim 1, wherein said first set comprises said at least one context tag corresponding to an earlier time instance compared to context tags in said second set so that said first derived context data corresponds at least partially to an earlier time instance than said second derived context data.

3. A method according to claim 1, wherein said first set comprises context tags corresponding to a longer time span compared to context tags in said second set so that said first derived context data corresponds to a longer time span than said second derived context data.

4. A method according to claim 1, further comprising:
calculating a distance between said first and second sparse context vectors to determine said difference.

5. A method according to claim 1, further comprising:
determining a first context from said first sparse context vector using said codebook,
determining a second context from said second sparse context vector using said codebook, and
calculating a distance between said determined first context and said determined second context to determine said difference.

6. An apparatus comprising at least one processor, and at least one memory including computer program code for one or more program units, the at least one memory and the computer program code configured to, with the processor, cause the apparatus to perform at least the following:
form a first set of context tags and a second set of context tags, said first set and said second set corresponding to a context of said apparatus, wherein said first set comprises at least one context tag in a first time span of said system and said second set comprises at least one context tag in a second time span of said system,
form, by the at least one processor of the device, a codebook of sparse vectors, said sparse vectors corresponding to said first set of context tags and said second set of context tags, wherein said sparse vectors have a high dimension with respect to a number of non-zero elements in said sparse vectors,
use said codebook to form a first sparse context vector from said first set of context tags and a second sparse context vector from said second set of context tags, wherein forming said codebook comprises:
forming random sparse vectors for documents, said documents comprising tags,
adding a contribution to a codebook vector of a tag from those said sparse vectors for documents where said tag is present, and
repeating said adding the contribution for a plurality of tags,
derive first derived context data from said first set and second derived context data from said second set,
determine a difference between said first derived context data and said second derived context data using said first sparse context vector and said second sparse context vector,
determine that a change of context has occurred based on said difference, and
control said apparatus in response to said determined change of context, wherein said second derived context data reflect a change in said context faster than said first derived context data.

7. An apparatus according to claim 6, wherein said first set comprises said at least one context tag corresponding to an earlier time instance compared to context tags in said second set so that said first derived context data corresponds at least partially to an earlier time instance than said second derived context data.

8. An apparatus according to claim 6, wherein said first set comprises context tags corresponding to a longer time span compared to context tags in said second set so that said first derived context data corresponds to a longer time span than said second derived context data.

9. An apparatus according to claim 6, further comprising computer program code configured to, with the at least one processor, cause the apparatus to perform at least the following:
calculate a distance between said first and second sparse context vectors to determine said difference.

10. An apparatus according to claim 6, further comprising computer program code configured to, with the at least one processor, cause the apparatus to perform at least the following:
determine a first context from said first sparse context vector using said codebook,
determine a second context from said second sparse context vector using said codebook, and
calculate a distance between said determined first context and said determined second context to determine said difference.

11. A computer program product comprising at least one non-transitory computer-readable medium, said medium including one or more computer-executable instructions that when executed by one or more processors cause a system to carry out at least the following:
form a first set of context tags and a second set of context tags, said first set and said second set corresponding to a context of said system, wherein said first set comprises at least one context tag in a first time span of said system and said second set comprises at least one context tag in a second time span of said system,
form, by the at least one processor of the device, a codebook of sparse vectors, said sparse vectors corresponding to said first set of context tags and said second set of context tags, wherein said sparse vectors have a high dimension with respect to a number of non-zero elements in said sparse vectors,
use said codebook to form a first sparse context vector from said first set of context tags and a second sparse context vector from said second set of context tags, wherein forming said codebook comprises:
forming random sparse vectors for documents, said documents comprising tags,
adding a contribution to a codebook vector of a tag from those said sparse vectors for documents where said tag is present, and
repeating said adding the contribution for a plurality of tags,
derive first derived context data from said first set and second derived context data from said second set,
determine a difference between said first derived context data and said second derived context data using said first sparse context vector and said second sparse context vector,
determine that a change of context has occurred based on said difference, and
control said system in response to said determined change of context, wherein said second derived context data reflect a change in said context faster than said first derived context data.

12. The computer program product according to claim 11, wherein said first set comprises said at least one context tag corresponding to an earlier time instance compared to context tags in said second set so that said first derived context data corresponds at least partially to an earlier time instance than said second derived context data.

13. The computer program product according to claim 11, wherein said first set comprises context tags corresponding to a longer time span compared to context tags in said second set so that said first derived context data corresponds to a longer time span than said second derived context data.

14. The computer program product according to claim 11, wherein the computer-executable program code portion further comprise program code instructions configured to:
form random sparse vectors for documents, said documents comprising tags,
add a contribution to a codebook vector of a tag from those said sparse vectors for documents where said tag is present, and
repeat said adding the contribution for a plurality of tags.

15. The computer program product according to claim 11, wherein the computer-executable program code portion further comprise program code instructions configured to:
calculate a distance between said first and second sparse context vectors to determine said difference.

16. A method according to claim 1, wherein controlling said device comprises altering a state of an application on said device.

* * * * *